United States Patent [19]
Sartori et al.

[11] 4,405,578
[45] Sep. 20, 1983

[54] CO-PROMOTED ACID GAS SCRUBBING SOLUTION AND PROCESS FOR USING SAME

[75] Inventors: Guido Sartori, Linden; Warren A. Thaler, Aberdeen, both of N.J.

[73] Assignee: Exxon Research and Engineering Co., Florham Park, N.J.

[21] Appl. No.: 321,060

[22] Filed: Nov. 13, 1981

[51] Int. Cl.³ .................. B01D 53/34; C09K 3/00
[52] U.S. Cl. .................. 423/223; 423/228; 423/229; 423/232; 423/234; 252/189; 252/190; 252/192
[58] Field of Search .......... 423/223, 226, 228, 229, 423/232, 234; 252/189, 190, 192

[56] References Cited

U.S. PATENT DOCUMENTS 4,094,957 6/1978 Sartori et al. .................. 423/223
4,112,050 9/1978 Sartori et al. .................. 423/223

FOREIGN PATENT DOCUMENTS 767105 11/1971 Belgium .................. 423/226
1305718 2/1973 United Kingdom .......... 423/226

*Primary Examiner*—Earl C. Thomas
*Attorney, Agent, or Firm*—Albert P. Halluin; Janet Hasak

[57] ABSTRACT

The present invention relates to an alkaline salt promoter system comprising specific mixtures of lower aliphatic mono-substituted alpha amino acids and sterically hindered diamino or triamino compounds and their use in acid gas scrubbing processes. The preferred promoter system comprises a mixture of N-secondary butyl glycine and N-cyclohexyl-1,3-propanediamine or N-cyclohexyl-1, 4-butanediamine.

14 Claims, No Drawings

CO-PROMOTED ACID GAS SCRUBBING SOLUTION AND PROCESS FOR USING SAME

BACKGROUND OF THE INVENTION

1. Field of the Invention

The present invention relates to the use of a specific class of sterically hindered amino compounds in admixture with a specific class of amino acids as co-promoters for alkaline salts in "hot pot" type acid gas scrubbing processes.

2. Description of Related Patents

Recently, it was shown in U.S. Pat. No. 4,112,050 that sterically hindered amines are superior to diethanolamine (DEA) as promoters for alkaline salts in the "hot pot" acid gas scrubbing process. U.S. Pat. No. 4,094,957 describes an improvement to this process whereby amino acids, especially sterically hindered amino acids, serve to prevent phase separation of the aqueous solution containing sterically hindered amines at high temperatures and low fractional conversions during the acid gas scrubbing process.

One of the preferred sterically hindered amines described in these patents is N-cyclohexyl 1,3-propanediamine. The bulky cyclohexane ring on this diamino compound provides steric hindrance to the carbamate formed at this site thereby favoring the expulsion of $CO_2$ during regeneration, thereby leaving the hindered amino group free to protonate. The primary amino group of this diamino compound assists in maintaining solubility under lean conditions. Under lean conditions when there is insufficient carbonic acid present to protonate the hindered amino group, the molecule would be insoluble were it not for the primary amino group which forms a stable polar carbamate ion. However, even the carbamated primary amino group is insufficient to prevent insolubility of the compound under very lean conditions and an additional additive, as proposed in U.S. Pat. No. 4,094,957, an amino acid, is required to maintain solubility of the diamino compound. This amino acid also contributes to additional capacity and faster absorption rates for carbon dioxide, so it therefore acts as a co-promoter in addition to solubilizing the sterically hindered diamino compound. Screening studies of available amino acids as possible co-promoters for N-cyclohexyl 1,3-propanediamine based on cyclic capacity and rates of absorption ascertained that pipecolinic acid was one of the best amino acid co-promoters.

Pipecolinic acid, however, has shortcomings, e.g., it is rather expensive and its picoline precursor is in limited supply.

In view of the commercial potential of using the sterically hindered amino compounds as described and claimed in U.S. Pat. Nos. 4,094,957 and 4,112,050, there is a need for finding a sterically hindered amino compound promoter system which performs as well as the N-cyclohexyl-1,3-propanediamine-pipecolinic acid mixture. Specifically, there is a need for finding a less costly replacement for pipecolinic acid which also possesses its effectiveness.

Various amino acids have been proposed as promoters for alkaline salts in the "hot pot" gas scrubbing process. For example, British Pat. No. 1,305,718 describes the use of beta and gamma amino acids as promoters for alkaline salts in the "hot pot" acid gas treating process. These amino acids, however, are not suitable because the beta-amino acids undergo deamination when heated in aqueous potassium carbonate solutions. The gamma amino acids form insoluble lactams under the same conditions. Also, the alpha-amino acid, N-cyclohexyl glycine, as described in Belgian Pat. No. 767,105, forms an insoluble diketopiperazine when heated in aqueous solutions containing potassium carbonate.

SUMMARY OF THE INVENTION

It has now been discovered that certain well-defined lower aliphatic mono-substituted amino acids in admixture with certain sterically hindered diamino and triamino compounds are excellent co-promoters for alkaline salts in the "hot pot" acid gas scrubbing process. This promoter system provides for high carbon dioxide capacity and high rates of carbon dioxide absorption. The amino acids in this new promoter system are less expensive than pipecolinic acid thereby the economy of the new co-promoter system is greater than for the previously disclosed promoter system. In addition, the mixture of amino acids and sterically hindered amino compounds is superior to either of the individual amino acid and sterically hindered amino compound used alone in terms of carbon dioxide capacity and rates of absorption for carbon dioxide.

The tests shown in Example 3 and Table III on the use of this select group of amino acids in combination with sterically hindered diamino compounds provide a reabsorption capacity of at least 30 liters of $CO_2$ and a $CO_2$ adsorption rate such that 20 liters are absorbed in less than three minutes. As will be shown below, the select groups of amino acids used in the co-promoter system of the present invention are rather stable which lends themselves to use in large scale industrial processes. Certain beta-amino acids and N-cyclohexyl glycine, which appear to be good co-promoters for $CO_2$ scrubbing in the initial screening tests have a tendency to form degradation products on aging.

Accordingly, in one embodiment of the present invention, there is provided a process for the removal of $CO_2$ from a gaseous stream containing $CO_2$ which comprises contacting said gaseous stream (1) in an absorption step with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide comprising (1) at least one lower aliphatic amino acid and (ii) at least one sterically hindered diamino or triamino compound; said amino acid is selected from the group consisting of: N-secondary butyl glycine, N-n-butyl glycine, N-2-amyl glycine, N-isopropyl glycine, N-n-propyl alpha alanine and N-secondary butyl-alpha-alanine, and said sterically hindered diamino or triamino compound is defined by the general formulae:

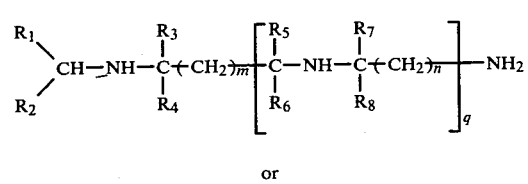

or

-continued

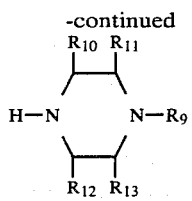

wherein $R_1$ and $R_2$ are hydrogen or $C_1$–$C_4$ aliphatic radicals or together form a $(CH_2)_p$ chain, wherein p is a integer ranging from 4 to 7, $R_3$ to $R_8$ are hydrogen or a methyl radical, $R_9$–$R_{13}$ are hydrogen, $C_1$–$C_3$ alkyl, $C_1$–$C_3$ aminoalkyl, $C_1$–$C_3$ hydroxyalkyl, or $C_1$–$C_3$ carboxy alkyl radicals, such that at least one of the groups $R_{10}$ and $R_{12}$ is different from hydrogen, m and n are positive integers ranging from 2–6 and q is zero or a positive integer ranging from 1–3, and (2) in a desorption and regeneration step, desorbing at least a portion of the absorbed $CO_2$ from said absorbing solution. The most preferred admixture comprises N-secondary butyl glycine and N-cyclohexyl-1,3-propane-diamine or N-cyclohexyl-1,4-butanediamine. The mole ratio of the sterically hindered monosubstituted amino acid and the sterically hindered amino compound may vary widely, but is preferably 1:3 to 3:1, most preferably, 1:1.

As another embodiment of the present invention, there is provided an acid gas scrubbing composition comprising: (a) 10 to about 40% by weight of an alkali metal salt or hydroxide; (b) 2 to about 20% by weight of a lower aliphatic amino acid; (c) 2 to about 20% by weight of a sterically hindered diamino or triamino compound; and (d) the balance, water. The amino acid is selected from the group consisting of: N-secondary butyl glycine, N-n-butyl glycine, N-2-amyl glycine, N-isopropyl glycine, N-n-propyl alpha-alanine and N-secondary butyl alpha-alanine, and the sterically hindered diamino or triamino compound is defined by the general formulae:

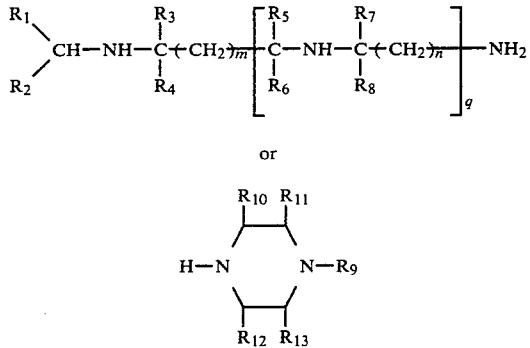

wherein $R_1$ and $R_2$ are hydrogen or $C_1$–$C_4$ aliphatic radicals or together form a $(CH_2)_p$ chain, wherein p is 4 to 7, $R_3$ to $R_8$ are hydrogen or a methyl radical, $R_9$–$R_{13}$ are hydrogen, $C_1$–$C_3$ alkyl, $C_1$–$C_3$ aminoalkyl, $C_1$–$C_3$ hydroxyalkyl, or $C_1$–$C_3$ carboxyalkyl radicals such that at least one of the groups $R_{10}$ and $R_{12}$ is different from hydrogen, m and n are positive integers ranging from 2–6 and q is zero or a positive integer ranging from 1–3. Most preferably, the amino acid will be comprised of N-secondary butyl glycine and the sterically hindered diamino or triamino compound will be N-cyclohexyl-1,3-propanediamine or N-cyclohexyl-1,4-butanediamine.

In general, the aqueous scrubbing solution will comprise an alkaline material comprising a basic alkali metal salt or alkali metal hydroxide selected from Group IA of the Periodic Table of Elements. More preferably, the aqueous scrubbing solution comprises potassium or sodium borate, carbonate, hydroxide, phosphate or bicarbonate. Most preferably, the alkaline material is potassium carbonate.

The alkaline material comprising the basic alkali metal or salt or alkali metal hydroxide may be present in the scrubbing solution in the range from about 10% to about 40% by weight, preferably from 20% to about 35% by weight. The actual amount of alkaline material chosen will be such that the alkaline material and the amino acid activator or promoter system remain in solution throughout the entire cycle of absorption of $CO_2$ from the gas stream and desorption of $CO_2$ from the solution in the regeneration step. Likewise, the amount and mole ratio of the amino acids is maintained such that they remain in solution as a single phase throughout the absorption and regeneration steps. Typically, these criteria are met by including from about 2 to about 20% by weight of the amino acid, preferably from 5 to 15% by weight, more preferably, 5 to 10% by weight of the sterically hindered monosubstituted amino acid and from 2 to about 20% by weight, preferably, 5 to about 15% by weight of the sterically hindered diamino or triamino compound.

The aqueous scrubbing solution may include a variety of additives typically used in acid gas scrubbing processes, e.g., antifoaming agents, antioxidants, corrosion inhibitors and the like. The amount of these additives will typically be in the range that they are effective, i.e., an effective amount.

DESCRIPTION OF THE PREFERRED EMBODIMENTS

The term acid gas includes $CO_2$ alone or in combination with $H_2S$, $SO_2$, $SO_3$, $CS_2$, HCN, COS and the oxides and sulfur derivatives of $C_1$ to $C_4$ hydrocarbons. These acid gases may be present in trace amounts within a gaseous mixture or in major proportions.

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber, the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. The amino acid aids in reducing foam in the contacting vessels.

The aqueous absorption solution comprising the alkaline material, the activator system comprising the lower aliphatic mono-substituted amino acid and the sterically hindered amino compound which is saturated or partially saturated with gases, such as $CO_2$ and $H_2S$ may be regenerated so that it may be recycled back to the absorber. The regeneration should also take place in a single liquid phase. Therefore, the presence of the highly water soluble amino acid provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention is facilitated by the use of the highly water soluble amino acid in the mixture.

As a typical example, during desorption, the acid gas, e.g., $CO_2$-rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will preferably be about 100° to about 140° C. during desorption. Single phase is maintained during desorption by regulating the amount of acid gas, e.g., $CO_2$, recovered.

In the most preferred embodiment of the present invention, the acid gas, e.g., $CO_2$ is removed from a gaseous stream by means of a process which comprises, in sequential steps, (1) contacting the gaseous stream with a solution comprising 10 to about 40 weight percent, preferably 20 to about 30 weight percent of potassium carbonate, an activator or promoter system comprising 2 to about 20 weight percent, preferably 5 to about 15 weight percent, more preferably 5 to about 10 weight percent of at least one lower aliphatic mono-substituted amino acid as herein defined, 2 to about 20 weight percent, and preferably 5 to about 15 weight percent of the sterically hindered amino compound as herein defined, the balance of said solution being comprised of water, said contacting being conducted at conditions whereby the acid gas is absorbed in said solution, and preferably at a temperature ranging from 25° to about 200° C., more preferably from 35° to about 150° C. and a pressure ranging from 100 to about 1500 psig, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is greater than obtained under the same operating conditions for removing acid gases from gaseous streams, wherein said same operating conditions do not include the mixture of the sterically hindered amino acid and sterically hindered amino compound co-promoter system. In other words, working capacity is defined as follows:

$$\begin{pmatrix} CO_2 \text{ in solution} \\ \text{at completion of} \\ \text{absorption} \end{pmatrix} \text{ less } \begin{pmatrix} CO_2 \text{ in solution} \\ \text{at completion of} \\ \text{desorption} \end{pmatrix}$$

Which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity, that is the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$, absorption pressure, (2) acid gas, e.g., $CO_2$, regeneration pressure, (3) temperature of absorption, (4) temperature of regeneration, (5) solution composition, that is weight percent amino acid, weight percent amine and the weight percent of the alkaline salt or hydroxide, for example potassium carbonate, and (6) gas composition. The skilled artisan may conveniently demonstrate the improved process which results by use of the lower aliphatic mono-substituted amino acid and sterically hindered diamino or triamino compound mixture by a comparison directly with a process wherein the mixture is not included in the aqueous scrubbing solutions. For example, it will be found when comparing two similar acid gas scrubbing processes (that is similar gas composition, similar scrubbing solution composition, similar pressure and temperature conditions) that when the sterically hindered amines are utilized the difference between the amount of acid gas, e.g., $CO_2$ absorbed at the end of step 1 (absorption step) defined above and step 2 (desorption step) defined above is significantly greater. This significantly increased working capacity is observed even though the scrubbing solution that is being compared comprises an equimolar amount of a prior art amine promoter, such as diethanolamine, 1,6-hexanediamine, etc. It has been found that the use of the admixture of the lower aliphatic mono-substituted amino acid and the sterically hindered diamino or triamino compound of the invention provides a working capacity which is at least 15% greater than the working capacity of a scrubbing solution which does not utilize a sterically hindered amine. Working capacity increases of from 20 to 60% may be obtained by use of the lower aliphatic mono-substituted amino acid and sterically hindered diamino or triamino compound compared to diethanolamine.

Besides increasing working capacity and rates of absorption and desorption, the use of the admixture of the lower aliphatic mono-substituted amino acid and sterically hindered diamino or triamino compound leads to lower steam consumption during desorption.

Steam requirements are the major part of the energy cost of operating an acid gas, e.g., $CO_2$ scrubbing unit. Substantial reduction in energy, i.e., operating costs will be obtained by the use of the process wherein the mixture is utilized. Additional savings from new plant investment reduction and debottlenecking of existing plants may also be obtained by the use of the mixture of the invention. The removal of acid gases such as $CO_2$ from gas mixtures is of major industrial importance, particularly the systems which utilize potassium carbonate activated by the unique activator or promoter system of the present invention.

While the sterically hindered amines, as shown in U.S. Pat. No. 4,112,050, provide unique benefits in their ability to improve the working capacity in the acid scrubbing process, their efficiency may decrease in alkaline "hot pot" (hot potassium carbonate) scrubbing systems at high temperatures and at low concentrations of the acid gas due to phase separation. Therefore, full advantage of the highly effective sterically hindered amines cannot always be utilized at these operating conditions. The addition of an amino acid, as a cosolvent, as shown in U.S. Pat. No. 4,094,957, solves the problem of phase separation and enables a more complete utilization of sterically hindered amines as the alkaline materials activator or promoter. This result was unexpected for the reason that many sterically hindered amino acids (including the sterically hindered amino acid, pipecolinic acid) alone, while soluble in these alkaline systems, are not as effective as activators in acid gas scrubbing processes as the other sterically hindered amino compounds. The specific admixture, as instantly claimed and disclosed, provides the same working capacity and/or rates of $CO_2$ absorption than those previously reported in U.S. Pat. No. 4,094,957, particularly the N-cyclohexyl 1,3-propanediamine and pipecolinic acid promoter system.

The absorbing solution of the present invention, as described above, will be comprised of a major proportion of the alkaline materials, e.g., alkali metal salts or hydroxides and a minor proportion of the amino acid activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

Many of the amino acids useful in the practice of the present invention are either available commercially or may be prepared by various known procedures.

Preferred lower aliphatic mono-substituted amino acids include: N-secondary butyl glycine; N-n-butyl glycine; N-2-amyl glycine; N-isopropyl glycine; N-n-propyl alpha-alanine; and N-secondary butyl-alpha-alanine.

N-secondary butyl glycine has the CAS Registry Number of 58695-42-4 and is mentioned as an intermediate in several U.S. Patents, e.g., U.S. Pat. Nos. 3,894,036; 3,933,843; 3,939,174 and 4,002,636, as well as the published literature (Kirino et al., Agric. Biol. Chem., 44(1), 31 (1980), but nothing is said in these disclosures about the synthesis of this amino acid or its use as a carbonate promoter in acid gas scrubbing processes.

A preferred method for preparing the amino acids comprises first reacting glycine or alanine under reductive conditions with a ketone in the presence of a hydrogenation catalyst. This reaction produces the sterically hindered monosubstituted amino acid. This process is more fully described and claimed in U.S. Ser. No. 321,058, filed concurrently herewith, entitled, "Amino Acids and Process for Preparing the Same" (G. Sartori and W. Thaler), the disclosure of which is incorporated herein by reference.

Preferred sterically hindered diamino or triamino compounds include: N-cyclohexyl-1,3-propanediamine; N-cyclohexyl-1,2-ethylenediamine; N-cyclohexyl-1,4-butanediamine; 2,2,5,5-tetramethyl-diethylene triamine; N-isopropyl-$N_2$(3-aminopropyl)-2-methyl-1,2-propanediamine, 2-methyl piperazine; 2,5-dimethylpiperazine; 2-tert. butylamino-methyl-1,4-dimethylpiperazine and the like.

The invention is illustrated further by the following examples which, however, are not to be taken as limiting in any respect. All parts and percentages, unless expressly stated to be otherwise, are by weight.

EXAMPLE 1

"Hot Pot" Acid Gas Treating Process

The reaction apparatus consists of an absorber and a desorber as shown in FIG. 1 of U.S. Pat. No. 4,112,050, incorporated herein by reference. The absorber is a vessel having capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents are put into a 2-liter Erlenmeyer:

55 g of N-cyclohexyl-1,3-propanediamine (CHPD)
22.8 of N-secondary butyl glycine (SBG)
225 g of $K_2CO_3$
447 g of water When all solid has dissolved, the mixture is put into the absorber and brought to 80° C. The apparatus is closed and evacuated until the liquid begins to boil. At this point $CO_2$ is admitted. In total, 39.1 liters of $CO_2$ is absorbed.

The rich solution is transferred to the desorber and boiled for one hour, during which time 30 liters of $CO_2$ is desorbed.

The regenerated solution so obtained is transferred back to the absorber and cooled to 80° C. The apparatus is closed and evacuated until the liquid begins to boil. At this point $CO_2$ is admitted. 33 liters of $CO_2$ is absorbed, of which 12 liters in the first minute.

The rich solution containing $K_2CO_3$, N-cyclohexyl-1,3-propanediamine and N-secondary butyl glycine is regenerated by boiling it for an hour, then used for a phase-behavior study.

About 600 g of regenerated solution is charged into a 1-liter autoclave equipped with Herculite window, reflux condenser and inlet and outlet for gases. The autoclave is brought to 250° F. while blowing a mixture containing 0.2% $CO_2$ and 99.8% He at about 0.2 liters/minute. When the outgoing gas has the same composition as the entering gas, equilibrium is reached. Only one phase is present.

If the experiment is repeated, replacing N-secondary butyl glycine with water, two liquid phases are present at equilibrium.

EXAMPLE 2

The procedure of Example 1 is repeated for several acid gas scrubbing solutions containing the mixture of sterically hindered amino acids and sterically hindered diamino compounds of the present invention as well as single component systems and the preferred co-promoter system of U.S. Pat. No. 4,094,957, i.e., N-cyclohexyl-1,3-propanediamine and pipecolinic acid. In each scrubbing solution there is added 225 g of $K_2CO_3$. The amino composition in the solution is adjusted so that the solution contains 0.52 moles of amino compounds and the mixtures contain 0.17 mole amino acid and 0.35 mole diamino compound. However, in the eighth (8) and ninth (9) experiments, in which an amino acid is used alone, 0.70 moles of the amino acid is used. In the tenth (10) experiment, 0.35 moles of N-cyclohexyl-1,3-propanediamine are used. The results of these tests are shown in Table I.

TABLE I

| | $CO_2$ SCRUBBING BY AMINO ACID/DIAMINO COMPOUND PROMOTER SYSTEM | | | |
|---|---|---|---|---|
| Amino Acid | Sterically Hindered Diamino Compound | Capacity (Liters $CO_2$ Reabsorbed) | Liters $CO_2$ Absorbed 1st Min. | Phases |
| 1. N—Isopropyl Glycine | N—Cyclohexyl-1,4-butanediamine | 33.9 | 14 | 1 |
| 2. N—Secondary Butyl Glycine | N—Cyclohexyl-1,4-butanediamine | 33.2 | 15 | 1 |
| 3. N—Secondary Butyl Glycine | N—Cyclohexyl-1,3-propanediamine | 33.0 | 12 | 1 |
| 4. N—Secondary Butyl alpha-Alanine | N—Cyclohexyl-1,3-propanediamine | 30.8 | 10 | 1 |
| 5. N—Secondary Butyl alpha-Alanine | N—Cyclohexyl-1,4-butanediamine | 30.7 | 9 | 1 |
| 6. 2- and 3-Amyl Glycine (Mixture) | N—Cyclohexyl-1,3-propanediamine | 30.3 | 11 | 1 |
| 7. N—Cyclohexyl Glycine | N—Cyclohexyl-1,4-butanediamine | 30.5 | 9 | 1 |
| 8. N—Secondary Butyl Glycine | — | 29.6 | 13 | 1 |
| 9. Pipecolinic Acid | — | 22.5 | 8 | 1 |
| 10. — | N—Cyclohexyl-1,3-propanediamine | 25.2 | 6 | 2 |
| 11. Pipecolinic Acid | N—Cyclohexyl-1,3-propanediamine | 31.2 | 12 | 1 |

EXAMPLE 3

The procedure of Example 1 is repeated for several acid gas scrubbing solutions containing a mixture of N-cyclohexyl-1,3-propanediamine and various amino acids. In each scrubbing solution there is added 225 g. of potassium carbonate and enough water to bring the solution total weight to 750 g. The amino composition in the solution is adjusted so that the mixture contains 0.17 mole amino acid and 0.35 mole N-cyclohexyl-1,3-propanediamine. The results of these tests are shown in Table II.

TABLE II

| | $CO_2$ SCRUBBING BY AMINO ACID/DIAMINO COMPOUND PROMOTER SYSTEM | | | | |
|---|---|---|---|---|---|
| | | Capacity (Liters $CO_2$ | Time (Min:Sec.) To Absorb | | |
| Amino Acid | Sterically Hindered Diamino Compound | Reabsorbed) | 10 Liters | 15 Liters | 20 Liters |
| 1. N—Secondary Butyl Glycine | N—Cyclohexyl-1,3-Propanediamine | 33.0 | 0:44 | 1:18 | 1:59 |
| 2. N—n-Butyl Glycine | N—Cyclohexyl-1,3-Propanediamine | 31.9 | 0:53 | 1:37 | 2:32 |
| 3. N—2-Amyl Glycine | N—Cyclohexyl-1,3-Propanediamine | 31.9 | 0:43 | 1:17 | 2:00 |
| 4. N—Isopropyl Glycine | N—Cyclohexyl-1,3-Propanediamine | 30.5 | 0:48 | 1:20 | 2:07 |
| 5. N—n-Propyl Alpha-Alanine | N—Cyclohexyl-1,3-Propanediamine | 30.8 | 0:59 | 1:50 | 2:55 |
| 6. N—Secondary Butyl Alpha-Alanine | N—Cyclohexyl-1,3-Propanediamine | 30.8 | 0:59 | 1:50 | 2:55 |
| 7. N—Isopropyl Alpha- | N—Cyclohexyl-1,3- | 29.8 | 1:27 | 2:38 | 3:47 |

TABLE II-continued

CO2 SCRUBBING BY AMINO ACID/DIAMINO COMPOUND PROMOTER SYSTEM

| Amino Acid | Sterically Hindered Diamino Compound | Capacity (Liters CO2 Reabsorbed) | Time (Min:Sec.) To Absorb 10 Liters | 15 Liters | 20 Liters |
|---|---|---|---|---|---|
| Alanine | Propanediamine | | | | |
| 8. N—n-Pentyl Glycine | N—Cyclohexyl-1,3-Propanediamine | 29.6 | 1:08 | 2:1 | 3:12 |
| 9. Pipecolinic Acid | N—Cyclohexyl-1,3-Propanediamine | 31 ± 1 | 0:53 | 1:30 | 2:21 |
| 10. N—Cyclohexyl Glycine | N—Cyclohexyl-1,3-Propanediamine | 31.5 | 0:46 | 1:19 | 2:03 |

The data in Table I show that N-isopropyl glycine, N-secondary butyl glycine, N-secondary butyl alpha-alanine, N-2-amyl glycine in combination with sterically hindered diamino compounds provide a reabsorption capacity of at least 30 liters of CO2 and absorption of 10 liters or more in the first minute. While the N-cyclohexyl glycine/N-cyclohexyl-1,4-butanediamine performed reasonably well, N-cyclohexyl glycine has a tendency to degrade into a diketopiperazine as shown in Example 4. The pipecolinic acid/N-cyclohexyl-1,3-proanediamine copromoter system, as disclosed in U.S. Pat. No. 4,094,957, is shown for the purpose of comparison.

The data in Table II provide additional data on rates of absorption for the amino acid/diamino promoter system of the present invention as well as for related promoter systems. These data show that the specific promoter system of the present invention, under the test conditions described, reabsorb at least 30 liters of CO2 and take less than three minutes to absorb 20 liters of CO2. In the case of N-n-butyl-3-amino butyric acid (test 12), N-n-butyl-3 amino butyric acid (test 13) and N-n-propyl-3-amino butyric acid (test 14), the criteria of at least 30 liters CO2 capacity and less than three minutes for 20 liters of absorption is met, but these beta-amino acids are unstable (and not practical for industrial use) as shown in Example 5. The other amino acid having relatively good performance, N-cyclohexyl glycine, is also unstable as shown in Example 4 (and consequently is not suitable for large scale industrial use). The pipecolinic acid/N-cyclohexyl-1,3-propanediamine system disclosed in U.S. Pat. No. 4,094,957, also shown for comparison has shortcomings because pipecolinic acid is rather expensive and its picoline precursor is in limited supply. Thus, the specific amino acids used in the copromoter system of the present invention enjoy the advantages of low cost of manufacturing as well as excellent high capacity and fast rates of absorption and reabsorption for CO2. Such benefits for this select group of amino acids would not be predicted from the disclosure in U.S. Pat. No. 4,094,957.

EXAMPLE 4

(a) Aging Studies in CO2 Scrubbing Apparatus

The following experiments are carried out to ascertain the stability of the amino acids under accelerated-simulated acid gas treating conditions.

The following reagents are charged into a stainless-steel bomb:
121 g of N-sec. butyl glycine
433 g of KHCO3
540 g of H2O The bomb is put into an oven and heated at 120° C. for 1000 hours. Then the content is discharged into a 2 liter flask and refluxed for several hours.

750 g is taken and subjected to an absorption-description-reabsorption cycle as described in Example 1. 27.9 Liters of CO2 is absorbed into the regenerated solution, 10 liters being absorbed in the first minute.

Comparison of this result with that obtained with the fresh solution, described in Example 1, shows that the aging process does not lead to a singnificant loss of activity.

If the aging experiment is carried out after replacing N-sec. butyl glycine with the equivalent amount of N-cyclohexyl glycine, 145 g, and reducing the water to 516 g in order to have the same total weight, a considerable amount of solid, identified as 1,4-bis-cyclohexyl-2,5-diketopiperazine is formed. An attempt to carry out an absorption-desorption cycle causes plugging of the unit.

(b) Aging Under CO2 and H2S

The following reagents are charged into a stainless-steel bomb:
121 g of N-sec. butyl glycine
24 g of K2S
390 g of KHCO3
544 g of water The bomb is put into an oven and heated at 120° C. for 1000 hours. Then the content is discharged into a 2 liter flask and refluxed for several hours.

765 g is taken and subjected to an absorption-desorption-reabsorption cycle as described in Example 1. 28.9 liters of CO2 is absorbed into the regenerated solution, 10 g being absorbed in the first minute. Comparison of this result with that obtained with the fresh solution, described in Example 1, shows that the aging process leads to only a slight loss of activity.

The excellent stability under the aging conditions shown above for the N-secondary butyl glycine coupled with its good performance as a promoter, especially in combination with the sterically hindered diamino compounds demonstrates the desirability of using this combination rather than N-cyclohexyl-1,3-propanediamine and N-cyclohexylglycine.

EXAMPLE 5

This example is given in order to show that beta-amino acids are not stable under alkaline conditions. The following solution is prepared in a 2-liter Erlenmeyer:

49.7 g of 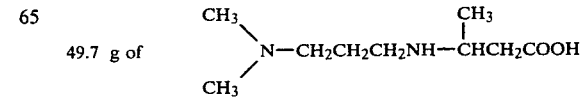

64.0 g of 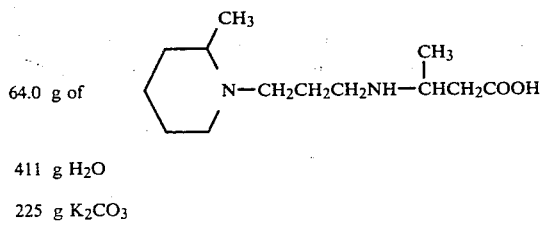

411 g H₂O 225 g K₂CO₃

When everything is dissolved, the solution is put into the absorber described in Example 1. An absorption-desorption-reabsorption cycle as described in Example 1 gives 32.2 liters of $CO_2$ reabsorbed, of which 11 liters are absorbed in the first minute.

The aged solution is prepared in the following way. The following reagents are charged into a stainless-steel bomb:

66.3 g of 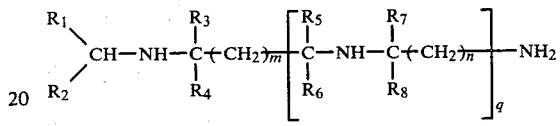

85.3 g of 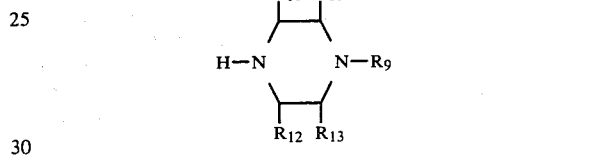

391.5 g of KHCO₃

23.9 g of K₂S 509 g of H₂O

The bomb is put into an oven at 120° C. and left there for 1000 hrs. After that, the bomb content is put into a 2-liter flask and boiled at reflux for some hours. 750 g of the solution so obtained is used to carry out a standard absorption-desorption-reabsorption test. Only 25 liters of $CO_2$ is reabsorbed, of which 6 liters are reabsorbed in the first minute.

¹³C-NMR analysis of the aged solution shows the presence of 32 peaks, whereas the fresh solution only has 18. The aged solution shows the presence of olefin bonds, which indicates that aging has led to decomposition of the diamino acids into diamines and crotonic acid.

The results shown above with respect to the beta-diamino acids agree with those obtained by Corbett, McKay and Taylor, *J. Chem Soc.* 5041 (1961) on beta-monoamino acids.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises contacting said gaseous stream (1) in an absorption step with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide comprising (i) at least one lower aliphatic mono-substituted amino acid and (ii) at least one sterically hindered diamino or triamino compound, said amino acid being selected from the group consisting of: N-secondary butyl glycine; N-n-butyl glycine, N-2-amyl glycine, N-n-propyl-alpha-alanine, N-secondary butyl-alpha-alanine, and said sterically hindered diamino or triamino compound being represented by the following general formulae:

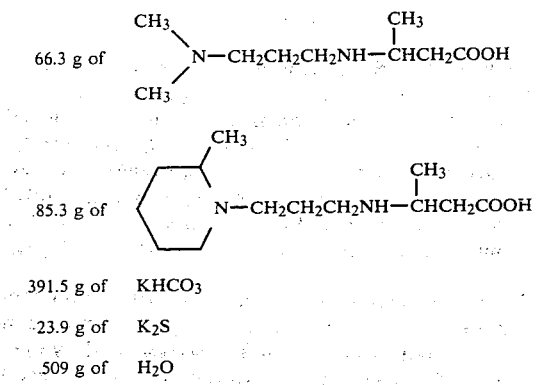

wherein $R_1$ and $R_2$ are hydrogen or $C_1$–$C_4$ aliphatic radicals or together form a —$CH_2$—$_p$ chain, wherein p is an integer ranging from 4 to 7, $R_3$ to $R_8$ are hydrogen or a methyl radical, $R_9$–$R_{13}$ are hydrogen, $C_1$–$C_3$ alkyl, $C_1$–$C_3$ aminoalkyl, $C_1$–$C_3$ hydroxyalkyl, or $C_1$–$C_3$ carboxylalkyl such that at least one of the groups $R_{10}$ and $R_{12}$ is different from hydrogen, m and n are positive integers ranging from 2–6 and q is zero or a positive integer ranging from 1–3, and (2) in a desorption and regeneration step, desorbing at least a portion of the absorbed $CO_2$ from said absorbing solution.

2. The process of claim 1 wherein the basic alkali metal salt or hydroxide is potassium carbonate.

3. The process of claim 1 wherein the aqueous solution contains 10 to about 40% by weight of said basic alkali metal salt or hydroxide.

4. The process of claim 1 wherein the aqueous solution contains 2 to about 20% by weight of said lower aliphatic mono-substituted amino acid and 2 to about 20% by weight of said sterically hindered diamino or triamino compound.

5. The process of claim 4 wherein the mole ratio of said lower aliphatic mono-substituted amino acid to said sterically hindered diamino or triamino compound ranges between 0.2 and 5.

6. The process of claim 4 wherein the mole ratio of said lower aliphatic mono-substituted amino acid to said sterically hindered diamino or triamino compound ranges between 0.5 and 2.

7. The process of claims 1 wherein said lower aliphatic mono-substituted amino acid is N-secondary butyl glycine and said sterically hindered diamino or triamino compound is N-cyclohexyl-1,3-propanediamine or N-cyclohexyl-1,4-butanediamine.

8. The process of claims 1, 2, 3, 4, 5 or 6, wherein the temperatures of the absorbing solution during the absorption step is in the range from about 25° to about 200° C., the pressure in the absorber ranges from about 5 to about 2000 psia and the partial pressure of the acid gas components in the feed stream ranges from about 0.1 to about 500 psia, and wherein the temperature of the absorbing solution during the regeneration step ranges from about 25° to about 200° C., and at pressures ranging from about 16 to about 100 psia.

9. The process of claims 1, 2, 3, 4, 5 or 6, wherein the absorbing solution additionally includes additives selected from the group consisting of antifoaming agents, antioxidants and corrosion inhibitors.

10. A process for the removal of $CO_2$ from a gaseous stream containing $CO_2$ which comprises, in sequential steps, (1) contacting the gaseous stream with an absorbing solution comprising (a) from about 20 to about 30% by weight of potassium carbonate, and (b) an activator or promoter system for the potassium carbonate, comprising (i) from about 5 to about 10% by weight of N-secondary butyl glycine, and (ii) from about 5 to about 15% by weight of N-cyclohexyl-1,3-propanediamine or N-cyclohexyl-1,4-butanediamine, (c) the balance of the solution comprising water and additives selected from the group consisting of antifoaming agents, antioxidants and corrosion inhibitors, wherein said contacting is conducted at conditions wherby $CO_2$ is absorbed in said absorbing solution and the temperature of the absorbing solution is in the range from about 35° C. to about 150° C., and the pressure in the absorber is in the range from about 100 to about 1500 psig; and (2) regenerating said absorbing solution at conditions whereby $CO_2$ is desorbed from said absorbing solution, wherein the regeneration takes place at temperatures ranging from about 35° to about 150° C. and at pressures ranging from about 5 to about 100 psig.

11. The process of claim 11 wherein the absorbing solution from the regeneration step is recycled for reuse in the absorption step.

12. An aqueous acid gas scrubbing composition comprising: (a) 10 to about 40% by weight of an alkali metal salt or hydroxide, (b) 2 to about 20% by weight of a lower aliphatic mono-substituted amino acid, and (c) 2 to about 20% by weight of a sterically hindered diamino or triamino compound, said amino acid being selected from the group consisting of: N-secondary butyl glycine, N-n-butyl glycine, N-2-amyl glycine, N-n-propyl-alpha-alanine, N-secondary butyl-alpha-alanine, said sterically hindered diamino or triamino compound being defined by the general formulae:

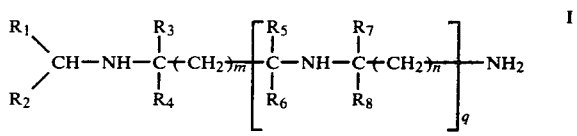

or

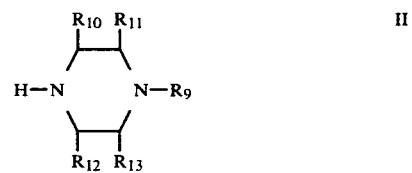

wherein $R_1$ and $R_2$ are hydrogen or $C_1$–$C_4$ aliphatic radicals or together form a $—CH_2—_p$ chain, wherein p is 4 to 7, $R_3$ to $R_8$ are hydrogen or a methyl radical, $R_9$–$R_{13}$ are hydrogen, $C_1$–$C_3$ alkyl, $C_1$–$C_3$ aminoalkyl, $C_1$–$C_3$ hydroxyalkyl, or $C_1$–$C_3$ carboxyalkyl radicals, such that at least one of the groups $R_{10}$ and $R_{12}$ is different from hydrogen, m and n are positive integers ranging from 2–6 and q is zero or a positive integer ranging from 1–3.

13. An aqueous acid gas scrubbing composition comprising: (a) 20 to 30% by weight of potassium carbonate, (b) 5 to about 10% by weight of N-secondary butyl glycine, (c) 5 to about 10% by weight of N-cyclohexyl-1,3-propanediamine or N-cyclohexyl-1,4-butanediamine, and (d) the balance, water.

14. The composition of claims 12, or 13, wherein the composition additionally includes antifoaming agents, antioxidants and corrosion inhibitors.

* * * * *